US007469535B2

(12) United States Patent
Sawada

(10) Patent No.: US 7,469,535 B2
(45) Date of Patent: Dec. 30, 2008

(54) HYDRAULIC DRIVING CONTROL DEVICE AND HYDRAULIC SHOVEL WITH THE CONTROL DEVICE

(75) Inventor: Hiroshi Sawada, Neyagawa (JP)

(73) Assignee: Komatsu Ltd., Tokyo (JP)

( * ) Notice: Subject to any disclaimer, the term of this patent is extended or adjusted under 35 U.S.C. 154(b) by 349 days.

(21) Appl. No.: 10/567,614

(22) PCT Filed: Aug. 6, 2004

(86) PCT No.: PCT/JP2004/011353

§ 371 (c)(1), (2), (4) Date: Feb. 8, 2006

(87) PCT Pub. No.: WO2005/014990

PCT Pub. Date: Feb. 17, 2005

(65) Prior Publication Data

US 2006/0235595 A1 Oct. 19, 2006

(30) Foreign Application Priority Data

Aug. 11, 2003 (JP) ............................ 2003-291471

(51) Int. Cl.
*F16D 31/02* (2006.01)

(52) U.S. Cl. .......................................... 60/433; 60/431

(58) Field of Classification Search .................. 60/431, 60/433, 434, 449

See application file for complete search history.

(56) References Cited

U.S. PATENT DOCUMENTS 4,773,369 A 9/1988 Kobayashi et al.
4,904,161 A * 2/1990 Kamide et al. ................ 60/434
5,630,317 A 5/1997 Takamura et al.
6,820,356 B2 * 11/2004 Naruse et al. ................. 60/431

FOREIGN PATENT DOCUMENTS

GB 2 171 757 A 9/1986
JP 61-200343 A 9/1986
JP 61-265370 A 11/1986

(Continued)

OTHER PUBLICATIONS

Japanese Office Action (and English translation thereof) dated Aug. 26, 2008, issued in a counterpart Japanese Application.

*Primary Examiner*—Michael Leslie
(74) *Attorney, Agent, or Firm*—Frishauf, Holtz, Goodman & Chick, P.C.

(57) ABSTRACT

A hydraulic operation controlling unit where the engine can be driven stably at a target output torque point and reduction in the work speed can be prevented at the time of light load, includes an engine control unit controlling the output of an engine, so that the output properties of the engine become equi-horsepower properties or approximately equi-horsepower properties in a predetermined engine speed range ($N_2$ to $N_6$) that includes engine speed $N_3$, which corresponds to a matching point $M_3$. A controlling unit increases or reduces the absorbing torque of a hydraulic pump in response to an increase or decrease in the engine speed, and thus, controls the absorbing torque of the hydraulic pump so as to make the output torque $T_3$ of the engine, which corresponds to matching point $M_3$, and the absorbing torque of the hydraulic pump coincide with each other.

4 Claims, 8 Drawing Sheets

FOREIGN PATENT DOCUMENTS

| | | | |
|---|---|---|---|
| JP | 2-038630 | A | 2/1990 |
| JP | 6-101651 | A | 4/1994 |
| JP | 6-280807 | A | 10/1994 |
| JP | 7-083084 | A | 3/1995 |
| JP | 2002-047965 | A | 2/2002 |

* cited by examiner

HYDRAULIC DRIVING CONTROL DEVICE AND HYDRAULIC SHOVEL WITH THE CONTROL DEVICE

This application is a U.S. National Phase Application under 35 USC 371 of International Application PCT/JP2004/011353 filed Aug. 6, 2004.

TECHNICAL FIELD

The present invention relates to a hydraulic operation controlling unit for controlling the hydraulic operation system of work machines and a hydraulic excavator provided with the same.

BACKGROUND ART

Conventional hydraulic operation controlling units, which are provided with a hydraulic pump that is operated by an engine and a hydraulic actuator that is operated by pressurized oil that is discharged from this hydraulic pump, and are formed in such a manner that the output properties of the engine are set in accordance with the work mode and the properties of the hydraulic pump are controlled so as to correspond to thus set output properties of the engine, as well as hydraulic excavators provided with the same have been known (see, for example, Patent Document 1). Here, in the hydraulic operation controlling unit that is proposed in this Patent Document 1, fluctuation in the engine speed due to the pump load is detected by an actual engine speed signal from an engine speed sensor and a throttle signal from a potentiometer that is attached to the fuel dial, the controller receives these signals and carries out an arithmetic operation, the result is sent to a TVC (Torque Variable Control) valve as a signal, and this TVC valve controls the amount of oil discharged by the hydraulic pump, and thereby, the output torque of the engine and the absorption torque of the hydraulic pump are always optimally matched with each other. In addition, when the pump load becomes excessive and the engine speed is reduced, the amount of oil discharged by the hydraulic pump is reduced as a result of a so called engine revolution sensing control, and thereby, the actual engine speed is instantly returned to the engine speed that corresponds to the rated output point so that the hydraulic pump can stably absorb the maximum horsepower of the engine so as to work highly efficiently.

Patent Document 1: Japanese Unexamined Patent Publication H2 (1990)-38630

In this type of the conventional hydraulic operation controlling unit, the present engine speed (the maximum engine speed without any load) is set at $N_7$ as shown in FIG. 8, for example, in active mode where the engine is set so as to correspond to the work that requires both speed and power, and thereby, an engine output torque property line $EL_1$ having a regulation line $R_1$ is set. In this active mode, the hydraulic pump absorbing torque property line $PL_1$ is set so that the hydraulic pump absorbs the output torque value $T_4$ at the output torque point $M_4$ (hereinafter, referred to as "matching point $M_4$") where the output of the engine becomes maximum, and thereby, the output torque of the engine and the absorbing torque of the hydraulic pump coincide with each other at matching point $M_4$. Meanwhile, in the economy mode, which is set so as to correspond to usual excavating work while achieving reduction in the fuel cost, as shown in the figure, the engine speed (the maximum engine speed without any load) is set at the engine speed $N_5$ which is smaller than engine speed $N_7$ in the active mode by a predetermined number of revolutions, and thereby, the engine output torque property line $EL_{50}$, having a regulation line $R_{50}$ that is set on the lower speed side of the above described regular line $R_1$, is set. In this economy mode, in order for the hydraulic pump to absorb the output torque value $T_3$ that corresponds to the output torque point $M_3$ (hereinafter, referred to as "matching point $M_3$") where the fuel efficiency of the engine is relatively high, in other words, the fuel consumption ratio (g/kw·h) of the engine is relatively low so as to make the engine operate efficiently, the absorbing torque of this hydraulic pump is controlled along equi-horsepower property line $PL_{50}$ and the output torque of the engine and the absorbing torque of the hydraulic pump can be made to coincide with each other at the matching point $M_3$.

DISCLOSURE OF THE INVENTION

Problem to be Solved by the Invention

In the above described conventional hydraulic operation controlling unit, however, the fuel cost can be reduced by switching from the active mode to the economy mode, whereas, the set engine speed is reduced from $N_7$ to $N_5$ by such a switch and therefore, the amount of oil discharged by the hydraulic pump is reduced proportionally to the difference ($N_7$-$N_5$) in the set engine speed at the time of light load work, and thus, a problem arises where the work speed becomes slow. In addition, in the case where there is a drastic fluctuation in the load, an extra engine output which corresponds to the area of the portion (portion indicated by hatching in FIG. 8) that is surrounded by equi-horsepower property line $PL_{50}$ and engine output torque property line $EL_{50}$ is outputted before the output torque of the engine and the absorbing torque of the hydraulic pump stably coincide with each other at the matching point $M_3$, and therefore, a problem that wasteful fuel is consumed arises. In addition, equi-horsepower property line $PL_{50}$ and engine output torque property line $EL_{50}$ have the same properties in such a manner that the absorbing torque of the hydraulic pump and the output torque of the engine are respectively reduced or increased in response to the increase or reduction change in the engine speed in the engine speed region, particularly in the vicinity of the matching point $M_3$, and therefore, even in the case where the absorbing torque of the hydraulic pump is controlled so as to follow equi-horsepower property line $PL_{50}$, such a control has a problem with the precision and stability in order to make the output torque of the engine and the absorbing torque of the hydraulic pump coincide with each other at the matching point $M_3$, and therefore, a problem arises where it is difficult to stably operate the engine at the targeted output torque point, that is to say, matching point $M_3$.

The present invention is provided in order to solve such problems, and an object thereof is to provide a hydraulic operation controlling unit where the engine can be stably operated at the targeted output torque point and the work speed at the time of a light load can be prevented from being lowered, and in addition, the fuel cost can be reduced, as well as to provide a hydraulic excavator that is provided with the same.

Means for Solving Problem

In order to achieve the above described object, a hydraulic operation controlling unit according to the first invention is provided with: an engine; a hydraulic pump that is operated by this engine; a hydraulic actuator that is operated by pressurized oil that is discharged from this hydraulic pump; an engine controlling means for controlling the output of the above described engine; and a hydraulic pump absorbing torque controlling means for controlling the absorbing torque of the above described hydraulic pump, characterized in that the matching point where the output torque of the above described engine and the absorbing torque of the above described hydraulic pump coincide with each other is predetermined in accordance with the work contents, the above described engine controlling means controls the output of the above described engine in such a manner that the output properties of the above described engine become equi-horsepower properties or approximately equi-horsepower properties in a predetermined engine speed region which includes the engine speed that corresponds to the above described matching point, and the above described hydraulic pump absorbing torque controlling means controls the absorbing torque of the above described hydraulic pump in such a manner that the output torque of the above described engine that corresponds to the above described matching point and the absorbing torque of the above described hydraulic pump are made to coincide with each other by increasing or reducing the absorbing torque of the above described hydraulic pump in accordance with an increase and decrease in the engine speed.

It is preferable for the hydraulic operation controlling unit according to the first invention to be provided with a memory means for storing the relationship between the output torque of the above described engine and the engine speed, and an engine speed detecting means for detecting the actual engine speed of the above described engine, wherein the above described engine controlling means obtains a torque value that is to be outputted by the above described engine from the relationship between the output torque of the above described engine and the engine speed that is stored in the above described memory means as well as the actual engine speed that is detected by the above described engine speed detecting means so that the output of the above described engine can be controlled on the basis of the torque value that has been obtained in this manner (second invention).

Next, a hydraulic excavator according to the third invention is characterized by being provided with the hydraulic operation controlling unit according to the first invention or the second invention.

Effects of the Invention

According to the first invention, the matching point where the output torque of the engine and the absorbing torque of the hydraulic pump coincide with each other is set in advance in accordance with the work contents. In addition, the output torque properties of the engine are provided in such a manner that the output torque of the engine decreases/increases as a result of the output control of the engine by means of the engine control means in accordance with equi-horsepower properties or approximately equi-horsepower properties together with an increase/decrease in the engine speed in a predetermined engine speed region that includes the engine speed that corresponds to the matching point. Meanwhile, the absorbing torque properties of the hydraulic pump are provided in such a manner that the output torque of the engine that corresponds to the matching point and the absorbing torque of the hydraulic pump are made to coincide with each other as a result of the absorbing torque control of the hydraulic pump by means of the hydraulic pump absorbing torque controlling means, and the absorbing torque of the hydraulic pump increases or decreases together with an increase/decrease in the engine speed. Accordingly, the output torque properties of the engine and the absorbing torque properties of the hydraulic pump cross each other at the matching point. As described above, in the case where the engine output torque properties and the hydraulic pump absorbing torque properties which respond to a change in the engine speed and become opposite properties to each other in response to this change in the engine speed cross each other at the matching point and thereby, the output torque of the engine tends to increase toward the matching point in response to an increase in the workload, the actual engine speed is converged to the engine speed that corresponds to the matching point. At this time, the output torque of the engine changes in accordance with the equi-horsepower properties or approximately equi-horsepower properties of the engine itself, and therefore, fluctuation in the output torque of the engine in response to the fluctuation in the engine speed becomes small. Accordingly, the output torque of the engine and the absorbing torque of the hydraulic pump coincide with each other precisely and stably at the matching point, and therefore, the engine can be stably operated at the targeted output torque point, that is to say, at the matching point. Furthermore, when the actual engine speed is converged to the engine speed which corresponds to the matching point, the output of the engine is maintained at the engine output that is required at this matching point, and therefore, the engine does not fall into a state of excessive output. Accordingly, the fuel costs can be reduced.

In addition, according to the first invention, when the workload starts to decrease in a state where the output torque of the engine and the absorbing torque of the hydraulic pump coincide with each other at the matching point, the actual engine speed starts increasing in accordance with equi-horsepower properties or approximately equi-horsepower properties of the engine itself, and when the workload further decreases, the actual engine speed increases toward the maximum engine speed without any load (set engine speed). Therefore, it becomes possible to set the engine speed at a relatively high value taking into account an increase in the engine speed due to equi-horsepower properties or approximately equi-horsepower properties, and thus, the work speed at the time of a light load can be prevented from being lowered.

The freedom of the output control of the engine can be increased by adopting the configuration according to the second invention.

According to the third invention, a hydraulic excavator can be provided where the engine can be stably operated at the targeted output torque point, that is to say, at the matching point, and in addition, the work speed at the time of a light load can be prevented from being lowered and the fuel costs can be reduced.

EXPLANATION OF SYMBOLS

| | |
|---|---|
| 1 | hydraulic excavator |
| 2a | hydraulic motor for traveling |
| 2b | traveling unit |
| 3 | rotating unit |
| 3a | hydraulic motor for rotation |
| 5 | work machine |
| 10 | boom cylinder |
| 11 | arm cylinder |
| 12 | bucket cylinder |
| 15 | hydraulic operation controlling unit |
| 16 | engine |
| 17 | hydraulic pump |
| 19 | fuel injection unit |
| 20 | controller |
| 20a | memory unit |
| 21 | fuel dial |
| 21a | potentiometer |
| 22 | engine speed sensor |
| 23 | engine control unit |
| 27 | hydraulic pump absorbing torque controlling unit |

$M_3$ matching point (economy mode)

$M_4$ matching point (active mode)

Best Mode for Carrying Out the Invention

Next, a hydraulic operation controlling unit and a hydraulic excavator that is provided with the same according to the concrete embodiments of the present invention are described in reference to the drawings.

Figure 1:
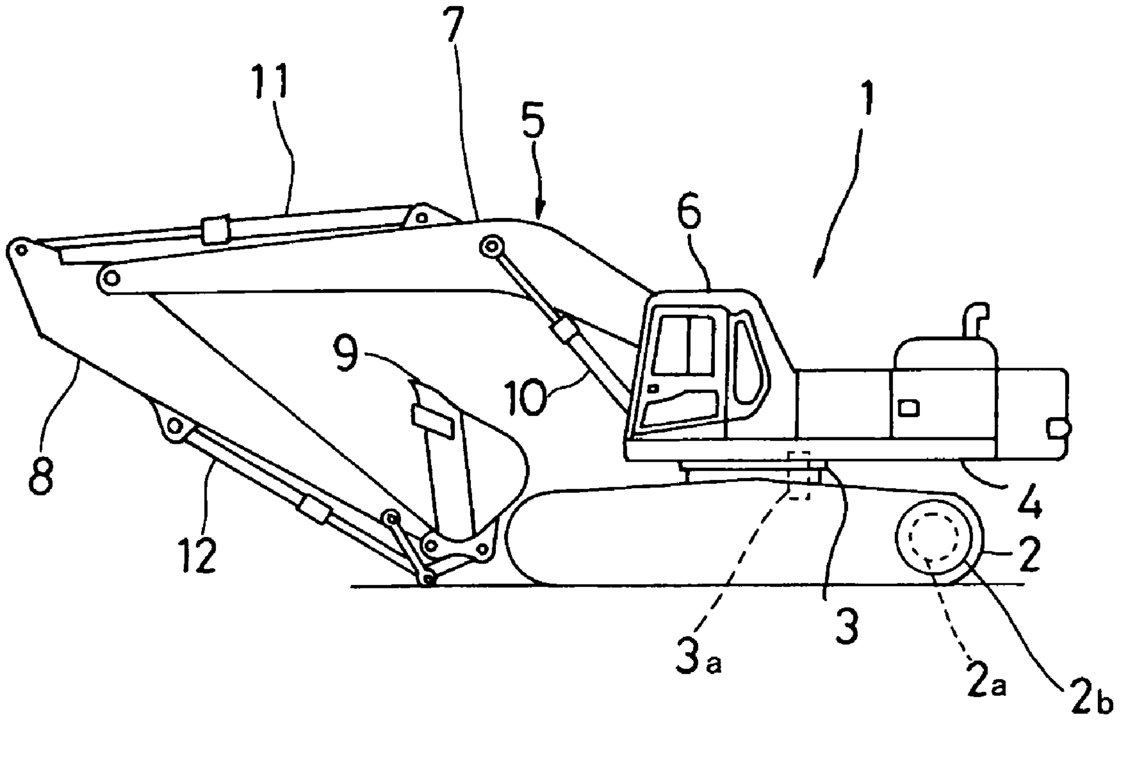
FIG. 1 is a side diagram showing a hydraulic excavator according to one embodiment of the present invention.

FIG. 1 is a side diagram showing a hydraulic excavator according to one embodiment of the present invention. In addition, FIG. 2 is a schematic diagram showing the system configuration of a hydraulic operation controlling unit according to the present embodiment.

As shown in FIG. 1, a hydraulic excavator 1 of the present embodiment is formed of a lower traveling body 2 that is provided with a traveling unit 2*b* that is driven by a hydraulic motor 2*a* for traveling, a rotating unit 3 that is driven by a hydraulic motor 3*a* for rotation, an upper rotating body 4 that is provided on top of the above described lower traveling body 2 via this rotating unit 3, a work machine 5 that is attached to the center portion of the front part of this upper rotating body 4 and a cabin 6 that is provided at the left portion of the front part of this upper rotating body 4. A boom 7, an arm 8 and a bucket 9 are connected to each other forming the above described work machine 5 in this order starting from the upper rotating body 4 side so as to be rotatable respectively, and hydraulic cylinders (boom cylinder 10, arm cylinder 11 and bucket cylinder 12) are placed so as to correspond to the above described boom 7, arm 8 and bucket 9, respectively.

Figure 2:
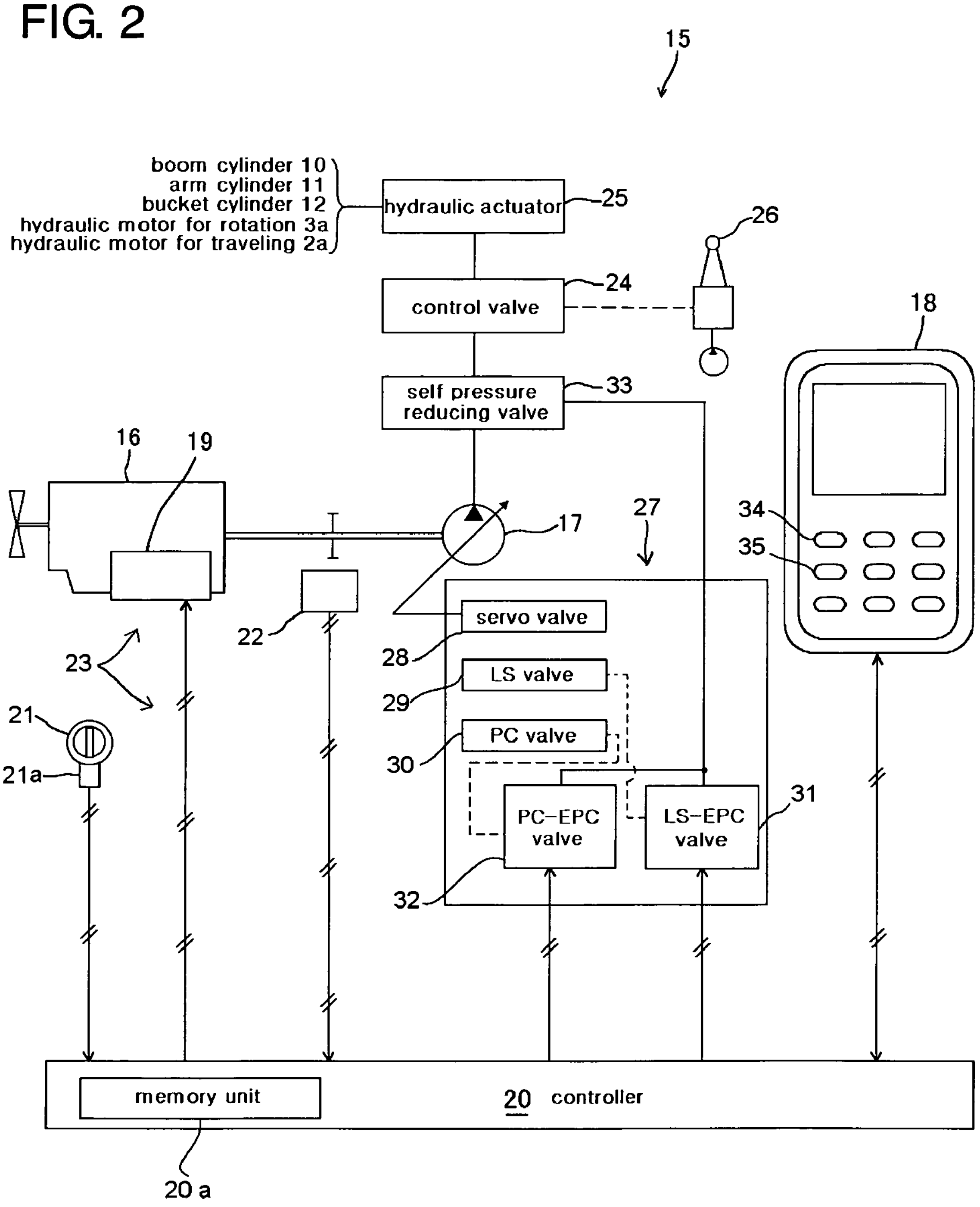
FIG. 2 is a schematic diagram showing a system configuration of a hydraulic operation controlling unit according to the present embodiment.

A hydraulic operation controlling unit 15 that is provided to this hydraulic excavator 1 has, as shown in FIG. 2 a diesel type engine 16, a hydraulic pump (variable capacity type swash plate system piston pump) 17 that is driven by this engine 16 and a monitor panel 18 that is placed inside the above described cabin 6.

Figure 3:
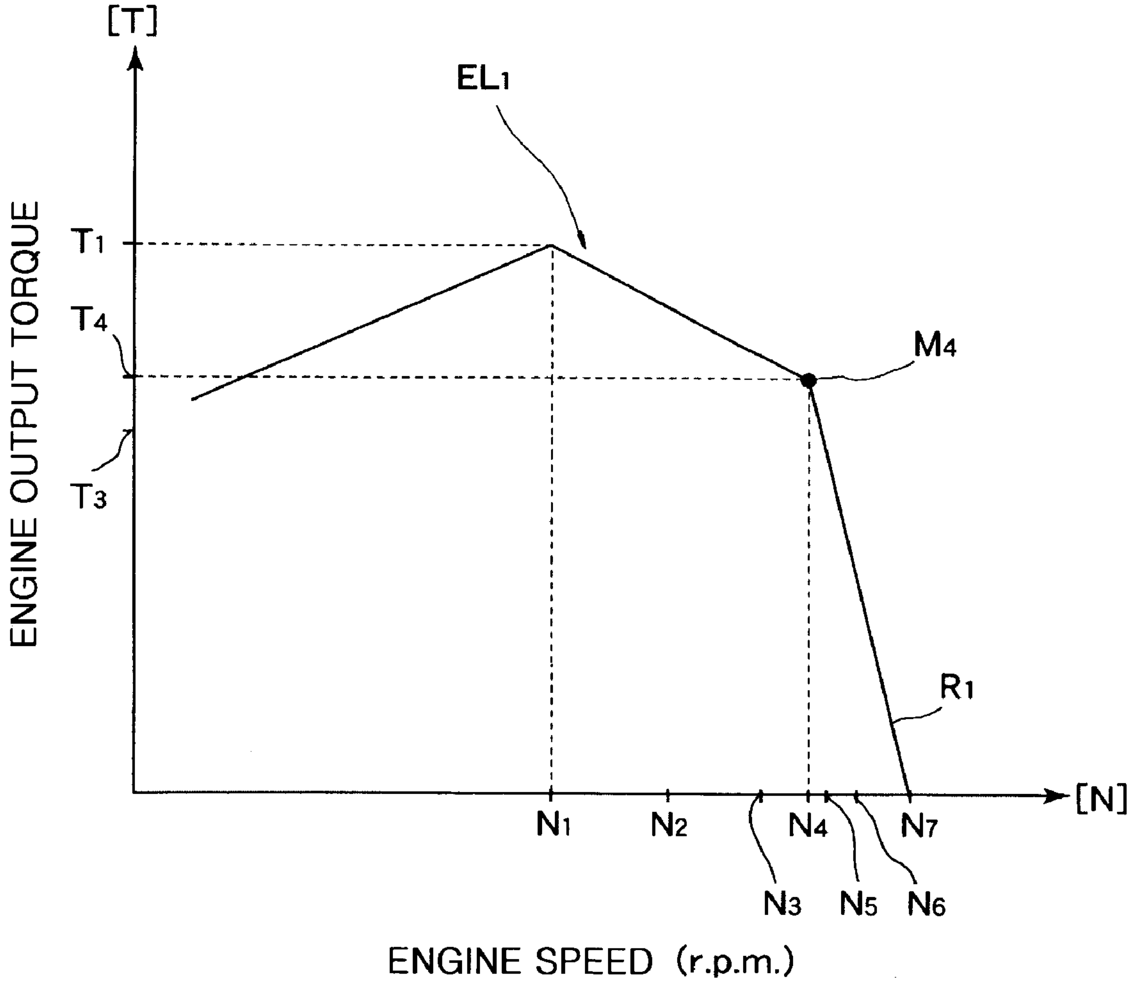
FIG. 3 is a graph showing the engine output torque properties at the time of active mode.
Figure 4:
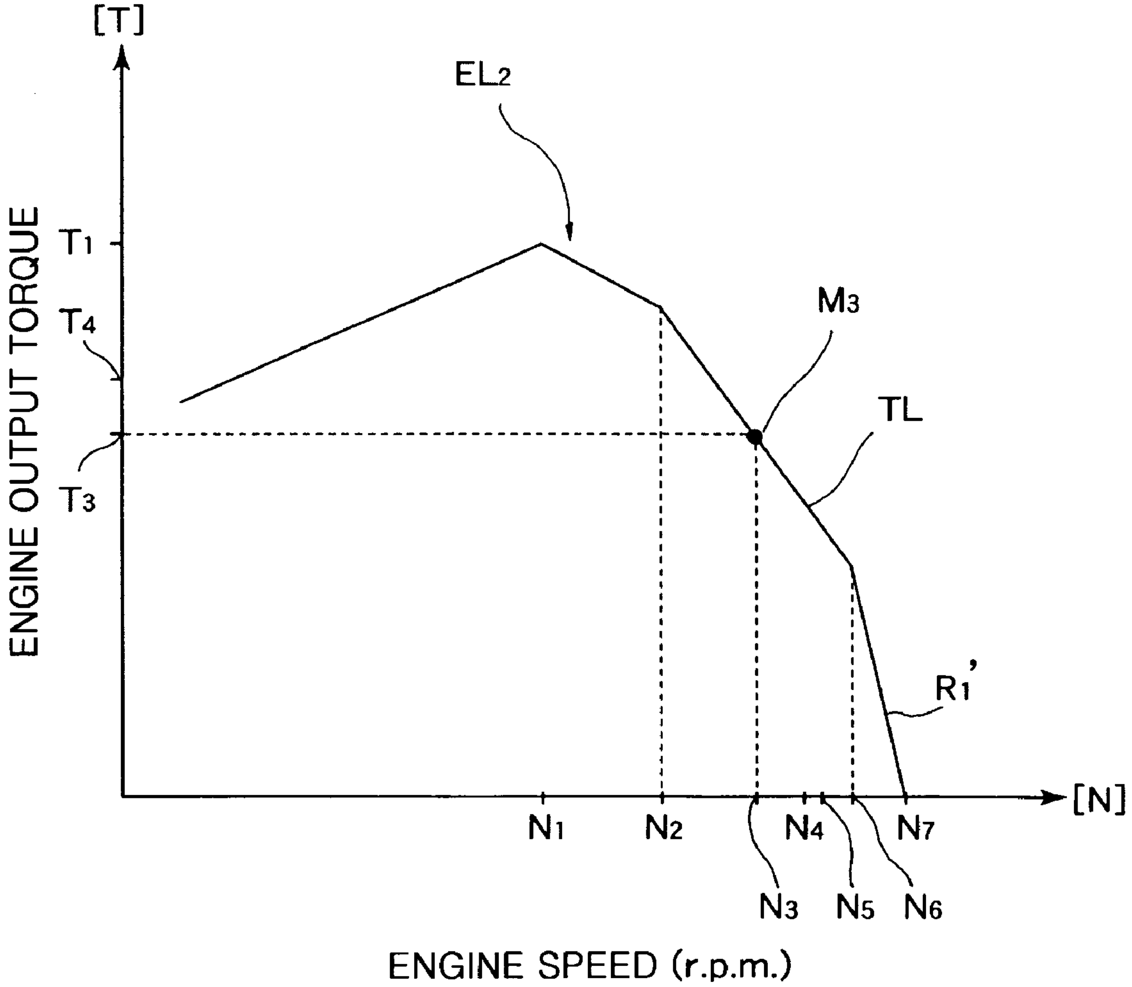
FIG. 4 is a graph showing the engine output torque properties at the time of economy mode.

The above described engine 16 is provided with an accumulator (common-rail) fuel injection unit 19. This fuel injection unit 19 is known in the art, and the description thereof in reference to the drawings is omitted, but is of a type where fuel is pressurized by means of a fuel pressurizing and sending pump so as to be accumulated in a common-rail chamber, and fuel is injected from an injector through opening and closing of an electromagnetic valve, and is provided in such a manner that the fuel injection properties are determined by the drive signal (instruction current) from controller 20 to the above described electromagnetic valve so that arbitrary injection properties ranging from a low speed region to a high speed region of engine 16 can be gained. In the present embodiment a so-called electronic control injection system is formed of equipment that includes fuel injection unit 19, controller 20 and a variety of sensors, and in such an electronically controlled injection system, the targeted injection properties are mapped with digital values, and thereby, the engine output torque properties respectively shown in FIGS. 3 and 4 can be gained.

Here, a fuel dial 21 is provided in order to set the amount of throttle of engine 16 and a throttle signal from a potentiometer 21*a* that is attached to this fuel dial 21 is inputted into controller 20. In addition, the actual engine speed of engine 16 is detected by an engine speed sensor (which corresponds to "engine speed detecting means" according to the present invention) 22 and this detection signal is input into controller 20. In addition, in the engine output torque properties shown by the line with symbol $EL_1$ in FIG. 3, the set engine speed (maximum engine speed without any load) is $N_7$, the output (horsepower) of engine 16 becomes maximum at output torque point $M_4$ that is specified by engine speed $N_4$ and output torque value $T_4$, the maximum output torque value $T_1$ is gained when the engine speed is $N_1$, and regulation line $R_1$ is set in the engine speed region between a portion which slightly exceeds engine speed $N_4$ and set engine speed $N_7$. Meanwhile, in the engine output torque properties shown by the line of symbol $EL_2$ in FIG. 4, the set engine speed (maximum engine speed without any load) is $N_7$ and the output torque value when the engine speed is $N_3$ is $T_3$, equi-horsepower property line TL is set for the properties where the engine output torque varies so as to maintain the engine output approximately constant relative to the change in the engine speed in a predetermined engine speed region ($N_2$ to $N_6$) that includes the engine speed $N_3$, and regulation line $R_1'$ is set in essentially the same manner as the above described regulation line $R_1$ in the engine speed region from engine speed $N_6$ to set engine speed $N_7$. Here, engine control unit 23 that includes fuel injection unit 19, controller 20, potentiometer 21*a* and engine speed sensor 22, corresponds to the "engine control means" according to the present invention.

As shown in FIG. 2, the above described hydraulic pump 17 is connected to respective hydraulic actuators 25 (hydraulic motor 2*a* for traveling, hydraulic motor 3*a* for rotation, boom cylinder 10, arm cylinder 11 and bucket cylinder 12) via a control valve 24. In addition, a predetermined oil path switching operation is carried out in this control valve 24 through the operation of various types of operation levers 26 which are placed within cabin 6, and thus, traveling operations of lower traveling body 2, rotation operations of upper rotating body 4 and bending, extending, rising and falling operations of work machine 5 are carried out through predetermined operations of these operation levers 26 by an operator.

A hydraulic pump absorbing torque controlling unit 27 (which corresponds to the "hydraulic pump absorbing torque controlling means" according to the present invention) is attached to the above described hydraulic pump 17. This hydraulic pump absorbing torque controlling unit 27 is formed where a load sensing valve 29 (hereinafter referred to as "LS valve 29") which senses the workload [load concerning hydraulic operation parts (traveling unit 2*b*, rotating unit 3 and work machine 5)] so as to control the discharged amount of oil, a power control valve 30 (hereinafter referred to as "PC valve 30") which controls workload so that the workload does not exceed the horsepower (pump output) of the engine, an electromagnetic proportion control valve 31 (hereinafter referred to as "LS-EPC valve 31") which receives an instruction current from controller 20 and provides a pilot pressure which corresponds to this instruction current to the above described LS valve 29 so as to determine the amount of oil that is discharged from hydraulic pump 17, and an electromagnetic proportion control valve 32 (hereinafter referred to as "PC-EPC valve 32") which receives an instruction current from controller 20 and provides a pilot pressure which corresponds to this instruction current to the above described PC valve 30 so as to control the absorbing torque of hydraulic pump 17 are integrated into a hydraulic circuit which supplies pressurized oil to a servo valve 28 for adjusting the inclination angle of the swash plate of hydraulic pump 17. Here, pressurized oil of which the pressure has been adjusted by a self-pressure reducing valve 33 that is inserted in the path between hydraulic pump 17 and control valve 24 is supplied to the above described LS-EPC valve 31 and PC-EPC valve 32, respectively.

Here, the above described LS valve 29 controls the amount of oil Q that is discharged by the hydraulic pump 17, on the basis of the difference in pressure ΔPLS (=PP−PLS, hereinafter referred to as "difference in LS pressure") between the pressure (self pressure) PP discharged by hydraulic pump 17 and control valve 24. The discharged pressure PP of hydraulic pump 17, the outlet pressure PLS of control valve 24, and the pilot pressure from LS-EPC valve 31 are inputted into this LS valve 29, and the relationship between the difference in LS pressure ΔPLS and discharged amount of oil Q varies, depending on the value of the instruction current to LS-EPC valve 31 of controller 20. Meanwhile, the above described PC valve 30 is a valve which controls the flow amount so that it does not exceed a predetermined flow amount in accordance with discharged pressure PP of hydraulic pump 17 when pressure PP for discharge is high, no matter how much the operation stroke of control valve 24 increases, and controls the equi-horsepower so that the horsepower that is absorbed by hydraulic pump 17 does not exceed the horsepower of engine 16. That is to say, when the load increases during work and discharged pressure PP of hydraulic pump 17 increases, amount of oil Q discharged by hydraulic pump 17 is reduced, while when discharged pressure PP of hydraulic pump 17 decreases, amount of oil Q discharged by hydraulic pump 17 is increased. In this case, the relationship between discharged pressure PP of hydraulic pump 17 and amount of oil Q discharged by hydraulic pump 17 varies with the value of the instruction current that is supplied from controller 20 to PC-EPC valve 32 as a parameter.

In addition, controller 20 has a function of sensing the actual engine speed by means of engine speed sensor 22, and recovering the engine speed by reducing the amount of oil discharged by hydraulic pump 17 when the actual engine speed decreases due to an increase in the workload. That is to say, when the workload increases, and the actual engine speed becomes lower than the set value, the instruction current from controller 22 to PC-EPC valve 32 increases in accordance with the reduced amount of engine speed, and the angle of the swash plate of hydraulic pump 17 decreases. In short, hydraulic pump absorbing torque controlling unit 27 reduces/increases the absorbing torque of hydraulic pump 17 in accordance with an increase/decrease in the difference between the set engine speed of engine 16 (maximum engine speed without any load) and the actual engine speed, that is to say, increases/reduces the absorbing torque of hydraulic pump 17 in accordance with an increase/decrease in the engine speed in the case where the absorbing torque of hydraulic pump 17 reaches a predetermined value and further increases.

In this manner, the control of the absorbing torque of hydraulic pump 17 by means of hydraulic pump absorbing torque controlling unit 27 makes the absorbing torque properties of hydraulic pump 17 such that, for example, an output torque $T_4$ of engine 16 that corresponds to the below described matching point $M_4$, and the absorbing torque of hydraulic pump 17 coincide, and the absorbing torque of hydraulic pump 17 is increased or reduced in accordance with an increase or a decrease in the engine speed (see the hydraulic pump absorbing torque property line indicated by symbol $PL_1$ in FIG. 5). In addition, the absorbing torque properties of hydraulic pump 17 are such that, for example, output torque $T_3$ of engine 16 which corresponds to below described matching point $M_3$ and the absorbing torque of hydraulic pump 17 coincide with each other, and the absorbing torque of hydraulic pump 17 is increased or reduced in accordance with an increase or decrease in the engine speed (see the hydraulic pump absorbing torque property line indicated by symbol $PL_2$ in FIG. 5).

An active mode selection switch 34 and an economy mode selection switch 35 are respectively provided to the above described monitor panel 18 so as to correspond to the respective modes, the active mode and the economy mode which are set in accordance with the contents of work. Here, active mode is a work mode that is set so as to correspond to work where speed and power are both required, while economy mode is a work mode that is set so as to correspond to general excavating work while achieving reduction in the cost for fuel.

The above described controller 20 is formed of an input interface (not shown) for converting and rectifying input signals from a variety of sensors and switches, a microcomputer (not shown) for carrying out an arithmetic operation or a logic operation on input data in accordance with a predetermined procedure, an output interface (not shown) for converting the operation results to an actuator drive signal and outputting this actuator drive signal after the power of the signal has further been amplified as an instruction current, and a memory unit 20*a* (which corresponds to the "memory means" in the present invention). The above described memory unit 20*a* is formed primarily of a read only memory (ROM) for storing a predetermined program, a variety of tables and a variety of maps, and a rewritable memory (RAM) that is required for carrying out a predetermined program as a working memory. This memory unit 20*a* stores, for example, map data on the engine output torque properties indicated by the line of symbol $EL_1$ in FIG. 3, map data on the engine output torque properties indicated by the line of symbol $EL_2$ in FIG. 4, map data on the hydraulic pump absorbing torque properties indicated by the line of symbol $PL_1$ in FIG. 5, and map data on the hydraulic pump absorbing torque properties indicated by the line of symbol $PL_2$ in FIG. 5.

A variety of work mode selection signals which are outputted as a result of the operation of turning ON of the above described respective work mode selection switches 34 and 35 are inputted into this controller 20. In addition, in the case where the active mode is selected as a result of the operation of turning ON of work mode selection switch 34, for example, and at the same time, the amount of throttle is set at full by means of fuel dial 21, the engine output torque property map shown in FIG. 3 that is stored in memory unit 20*a* is read out, and the torque value that is to be outputted to engine 16 is obtained from this engine output torque property map shown in FIG. 3 and the actual engine speed that is detected by engine speed sensor 22, so that the amount of fuel that is to be injected into fuel injection unit 19 on the basis of the thus obtained torque value is obtained and a drive signal (instruction current) which satisfies this obtained amount of fuel to be injected is outputted to the electromagnetic valve in fuel injection unit 19. In addition, in the case where the economy mode is selected as a result of the operation of turning ON of work mode selection switch 35, for example, and at the same time, the amount of throttle is set at full by means of fuel dial 21, the engine output torque property map shown in FIG. 4 that is stored in memory unit 20*a* is read out, and the torque value that is to be outputted to engine 16 is obtained from this engine output torque property map shown in FIG. 4, and the actual engine speed that is detected by engine speed sensor 22 so that the amount of fuel that is to be injected into fuel injection unit 19 on the basis of the thus obtained torque value is obtained and a drive signal (instruction current) which satisfies this obtained amount of fuel to be injected is outputted to the electromagnetic valve in fuel injection unit 19.

Figure 5:
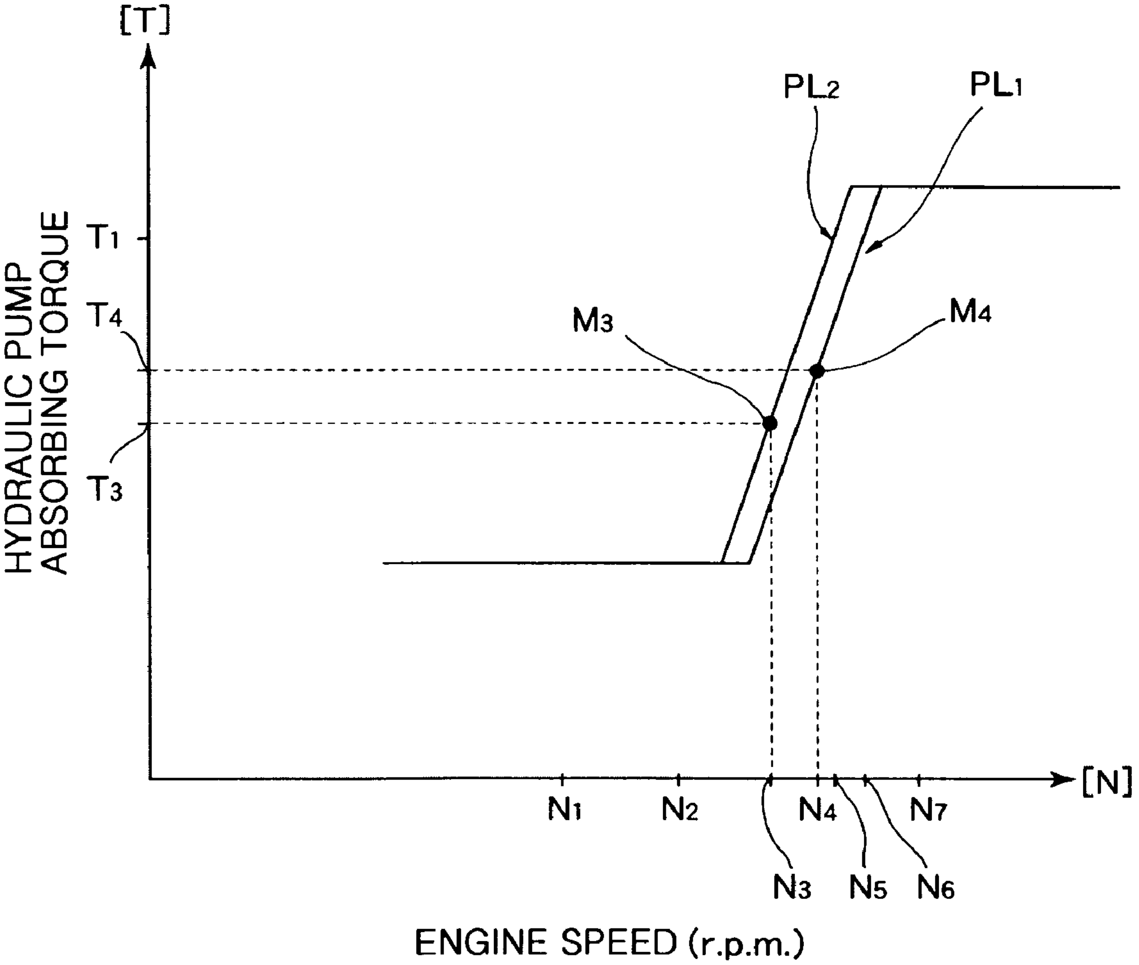
FIG. 5 is a graph showing the hydraulic pump absorbing torque properties.

In addition, controller 20 reads out the hydraulic pump absorbing torque property map that is indicated by the line of symbol $PL_1$ in FIG. 5 and is stored in memory unit 20*a* when the active mode is selected as a result of the operation of turning ON of work mode selection switch 34, and controls the instruction current to PC-EPC valve 32 on the basis of the hydraulic pump absorbing torque property map that is indicated by the line of symbol $PL_1$ in this FIG. 5 and the actual engine speed that is detected by engine speed sensor 22, so as to adjust the angle of the swash plate of hydraulic pump 17. In addition, controller 20 reads out the hydraulic pump absorbing torque property map that is indicated by the line of symbol $PL_2$ in FIG. 5 and is stored in memory unit 20*a* when the economy mode is selected as a result of the operation of turning ON of work mode selection switch 35, and controls the instruction current to PC-EPC valve 32 on the basis of the hydraulic pump absorbing torque property map that is indicated by the line of symbol $PL_2$ in this FIG. 5 and the actual engine speed that is detected by engine speed sensor 22, so as to adjust the angle of the swash plate of hydraulic pump 17.

Next, the operation of hydraulic operation controlling unit 15 in each of the above described work modes is described in the following, in reference to FIGS. 6 and 7. Here, in the following descriptions, the amount of throttle of engine 16 is set at full by means of fuel dial 21.

Figure 6:
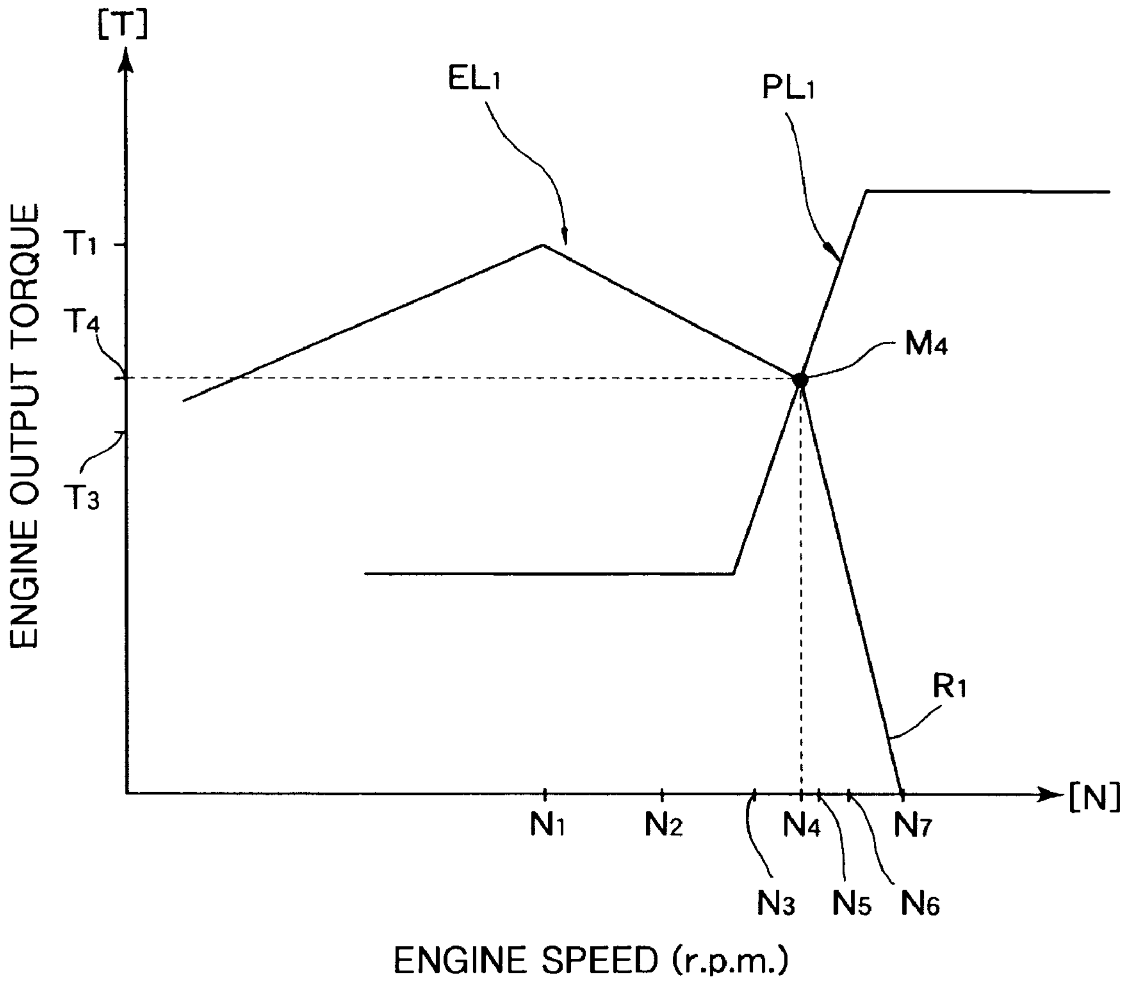
FIG. 6 is a graph showing the relationship between the engine output torque properties and the hydraulic pump absorbing torque properties at the time of active mode.

(In a Case where Active Mode is Selected: see FIG. 6)

When the operator turns on active mode selection switch 34, as shown in FIG. 6, engine output torque property line $EL_1$ having a regulation line $R_1$ is set. In addition, a matching point, indicated by symbol $M_4$ in FIG. 6, is set so as to make the output torque of engine 16 and the absorbing torque of hydraulic pump 17 coincide with each other at the output torque point where the output of engine 16 becomes maximum. In addition, hydraulic pump absorbing torque property line $PL_1$ which makes output torque $T_4$ of engine 16 and the absorbing torque of the hydraulic pump coincide with each other in this matching point $M_4$ is set.

In a state where this active mode is selected, engine 16 is driven on regulation line $R_1$ in engine output torque property line $EL_1$ in accordance with the size of the load during the time when the work load is light and the pressure of hydraulic pump 17 for discharging (load pressure) is low. When the work load increases and the load pressure of hydraulic pump 17 increases, in the end, output torque $T_4$ of engine 16 and absorbing torque of hydraulic pump 17 coincide with each other at the matching point $M_4$, where the output of engine 16 becomes maximum, and hydraulic pump 17 absorbs the maximum horsepower of engine 16 in order to work. In this manner, work which requires both speed and power can be performed well.

Figure 7:
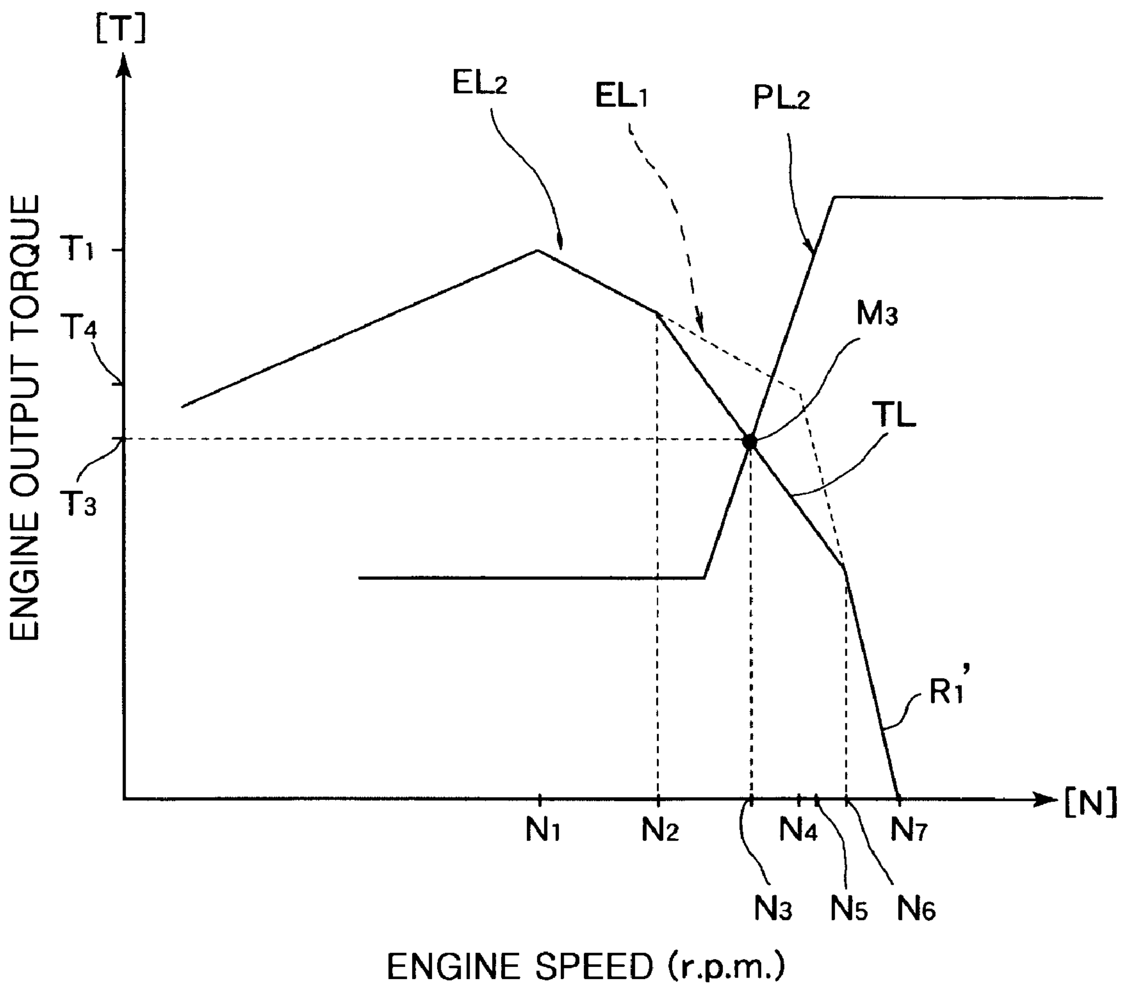
FIG. 7 is a graph showing the relationship between the engine output torque properties and the hydraulic pump absorbing torque properties at the time of economy mode.
Figure 8:
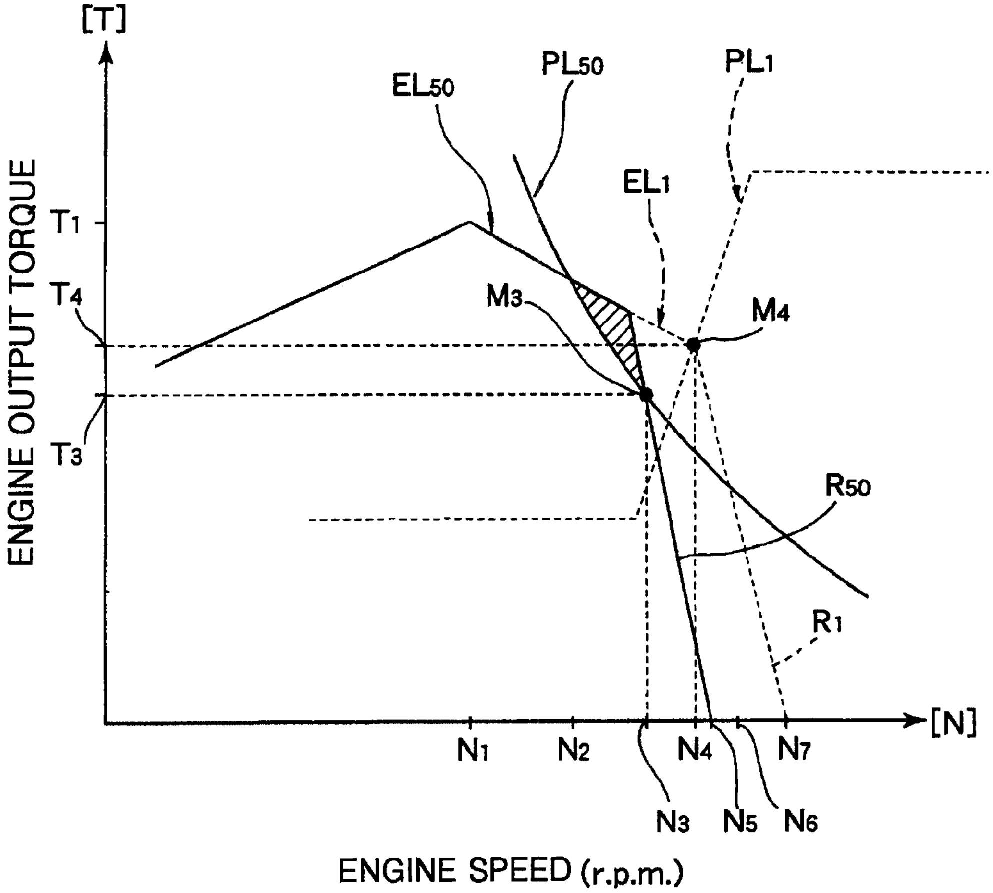
FIG. 8 PRIOR ART
FIG. 8 is a graph showing the relationship between the engine output torque properties and the hydraulic pump absorbing torque properties in a hydraulic operation controlling unit according to the prior art.

(In a Case where Economy Mode is Selected: see FIG. 7)

When the operator turns on economy mode selection switch 35, as shown in FIG. 7, the engine speed of engine 16 is set at $N_7$, in the same manner as in the above described active mode. In addition, a matching point, indicated by symbol $M_3$ in FIG. 7, is set so as to make the output torque of engine 16 and the absorbing torque of hydraulic pump 17 coincide with each other, and equi-horsepower property line TL for the properties of changing the output torque of engine 16 is set so as to maintain the output of the engine approximately constant relative to the change in the engine speed in a predetermined range ($N_2$ to $N_6$) of the engine speed that includes engine speed $N_3$ that corresponds to the above described matching point $M_3$. In this manner, the output torque changes in accordance with equi-horsepower property line TL for the engine speed from $N_2$ to $N_6$, and engine output torque property line $EL_2$ for the property where the output torque changes in accordance with regulation line $R_1$' having essentially the same properties as the above described regulation line $R_1$ for the engine speed from $N_6$ to $N_7$ is set. In addition, in this economy mode, hydraulic pump absorbing torque property line $PL_2$ for the properties where output torque $T_3$ of engine 16 that corresponds to matching point $M_3$ and the absorbing torque of hydraulic pump 17 coincide with each other, and the absorbing torque of hydraulic pump 17 is increased or reduced in accordance with an increase and decrease in the engine speed is set. That is to say, hydraulic pump absorbing torque property line $PL_2$ and equi-horsepower property line TL, which respond to a change in the engine speed and have opposite properties relative to a change in the engine speed cross at matching point $M_3$.

In a state where this economy mode is selected, engine 16 is driven on regulation line $R_1$' in engine output torque property line $EL_2$, in accordance with the size of the load at the time where the work load is light and the pressure of hydraulic pump 17 for discharging (load pressure) is low. When the work load increases and the load pressure of hydraulic pump 17 increases, engine 16 is driven along equi-horsepower property line TL in engine output torque property line $EL_2$ in accordance with the size of the load. After that, when the work load further increases and the load pressure of hydraulic pump 17 additionally increases, in the end, the output torque of engine 16 and the absorbing torque of hydraulic pump 17 coincide with each other at matching point $M_3$, and hydraulic pump 17 absorbs the engine horsepower at the engine speed $N_3$, in order to work. In the case where, at this matching point $M_3$, in a state where the output torque of engine 16 and the absorbing torque of hydraulic pump 17 coincide with each other, and some external disturbance causes (1) the actual engine speed to increase from engine speed $N_3$ that corresponds to matching point $M_3$, the output torque of engine 16 decreases so as to be smaller than the absorbing torque of hydraulic pump 17, and the actual engine speed decreases, and (2) the actual engine speed to decrease from engine speed $N_3$, the output torque of engine 16 increases so as to be greater than the absorbing torque of hydraulic pump 17, and the engine speed increases. As described above, converging force to return to matching point $M_3$ effectively works, and therefore, in the case where the output torque of engine 16 increases toward output torque value $T_3$ that corresponds to matching point $M_3$ due to an increase in the work load, the actual engine speed of engine 16 converges to engine speed $N_3$ that corresponds to matching point $M_3$. At this time, the output torque of engine 16 changes in accordance with equi-horsepower property line TL of engine 16, and therefore, the fluctuation in the output torque of engine 16 becomes slight, relative to the fluctuation in the engine speed. Accordingly, the output torque of engine 16 and the absorbing torque of hydraulic pump 17 coincide with each other precisely and stably at matching point $M_3$, and engine 16 can be driven stably at the target output torque point (matching point $M_3$).

In the economy mode according to the present embodiment, when the work load increases and the actual engine speed of engine 16 converges to engine speed $N_3$ that corresponds to matching point $M_3$, engine 16 is driven on equi-horsepower property line TL, and the output (horsepower) of engine 16 is maintained at the engine output (engine horsepower) that is required at this matching point $M_3$, and therefore, engine 16 does not output excessively. Accordingly, in this economy mode, the cost for fuel can be reduced as a whole, in comparison with the active mode.

In addition, in the economy mode according to the present embodiment, when the work load starts decreasing in a state where the output torque of engine 16 and the absorbing torque of hydraulic pump 17 coincide with each other at matching point $M_3$, the actual engine speed increases from $N_3$ to $N_6$ along equi-horsepower property line TL of engine 16, and when the work load further decreases, the actual engine speed increases from $N_6$ to set engine speed $N_7$ along regulation line $R_1$'. In conventional economy modes, the set engine speed is $N_5$, which is smaller than $N_7$ by a predetermined engine speed, whereas in the economy mode according to the present embodiment, it becomes possible to preset the engine speed of engine 16 at $N_7$, which is the same as that in the above described active mode taking the increment in the engine speed along equi-horsepower property line TL into account, and thus, reduction in the work speed at the time of light load can be prevented.

INDUSTRIAL APPLICABILITY

A hydraulic operation controlling unit according to the present invention can be utilized as a hydraulic operation controlling unit for work machines with a hydraulic system having an engine as a driving source, such as wheel loaders, tractors for agriculture and industrial vehicles, in addition to hydraulic excavators.

The invention claimed is:

1. A hydraulic operation controlling unit, comprising:

an engine;

a hydraulic pump that is operated by the engine;

a hydraulic actuator that is operated by pressurized oil that is discharged from the hydraulic pump;

an engine controlling means for controlling an output of said engine; and a hydraulic pump absorbing torque controlling means for controlling an absorbing torque of said hydraulic pump, wherein:

a matching point where an output torque of said engine and the absorbing torque of said hydraulic pump coincide with each other is predetermined in accordance with work requirements, said engine controlling means controls the output of said engine such that a power output of said engine is constant or approximately constant in a predetermined engine speed range which includes an engine speed that corresponds to said matching point, and said hydraulic pump absorbing torque controlling means controls the absorbing torque of said hydraulic pump such that the output torque of said engine that corresponds to said matching point and the absorbing torque of said hydraulic pump are made to coincide with each other by increasing or reducing the absorbing torque of said hydraulic pump in accordance with an increase and a decrease in the engine speed.

2. The hydraulic operation controlling unit according to claim 1, further comprising:

a memory means for storing a relationship between the output torque of said engine and the engine speed, and an engine speed detecting means for detecting an actual engine speed of said engine, and wherein said engine controlling means obtains a torque value that is to be outputted by said engine from the relationship between the output torque of said engine and the engine speed that are stored in said memory means and the actual engine speed that is detected by said engine speed detecting means, so that the output of said engine can be controlled based on the torque value that has been obtained.

3. A hydraulic excavator, comprising the hydraulic operation controlling unit according to claim 1.

4. A hydraulic excavator, comprising the hydraulic operation controlling unit according to claim 2.

* * * * *